United States Patent [19]
Knoishi et al.

[11] 3,806,105
[45] Apr. 23, 1974

[54] FLUID SHOCK ABSORBER

[75] Inventors: Hiromu Konishi; Ken-Ichi Chiku; Tadakiyo Watanabe, all of Toyota, Japan

[73] Assignee: Toyota Jidosha Kogyo Kabushiki Kaisha, Toyota-shi, Aichi-ken, Japan

[22] Filed: Feb. 7, 1972

[21] Appl. No.: 223,872

[30] Foreign Application Priority Data
Feb. 19, 1971 Japan.................................. 46-7830

[52] U.S. Cl................. 267/116, 188/129, 213/43, 213/223, 267/35, 267/139
[51] Int. Cl.......... F16f 5/00, F16f 9/06, F16f 11/00
[58] Field of Search........ 213/43, 223; 267/35, 113, 267/116, 136, 139, 64 A, 64 B, 118, 121; 188/129

[56] References Cited
UNITED STATES PATENTS

| | | | |
|---|---|---|---|
| 2,928,507 | 3/1960 | Thompson | 188/129 X |
| 3,276,763 | 10/1966 | Blatt | 267/116 |
| 3,109,520 | 11/1963 | Vossieck | 267/113 X |
| 2,056,106 | 9/1936 | Kuhn | 267/35 |
| 1,029,462 | 6/1912 | Rife | 267/35 |
| 3,329,241 | 7/1967 | Palmer et al. | 213/43 |
| 3,424,448 | 1/1969 | Chak Ma | 267/35 |

*Primary Examiner*—Robert G. Sheridan
*Assistant Examiner*—Howard Beltran
*Attorney, Agent, or Firm*—Stevens, Davis, Miller and Mosher

[57] ABSTRACT

This invention relates to a damper device. Said damper device comprises a first impact energy absorbing member formed with an orifice for a liquid fluid in a cylinder to pass therethrough when said fluid is compressed so as to attenuate an initial force of impact by the viscous resistance of the fluid passing through said orifice, a second impact energy absorbing member controlled by said first impact energy absorbing member to produce frictional resistance between an outer surface of said second impact energy absorbing member and an inner wall surface of the cylinder for further attenuating the force of impact, a third impact energy absorbing member made of a compressible material and disposed in the cylinder for continuously attenuating the force of impact by a back pressure of the fluid in the cylinder produced by said first impact energy absorbing member, and a fourth impact energy absorbing member cooperating with said first and third impact energy absorbing members for further absorbing and attenuating the residual force of impact.

6 Claims, 12 Drawing Figures

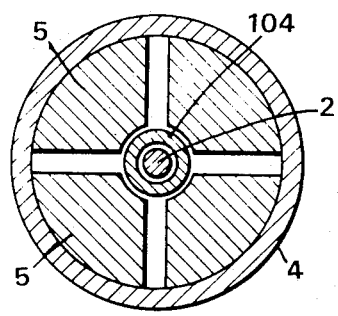
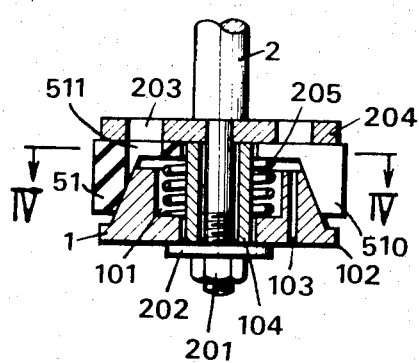
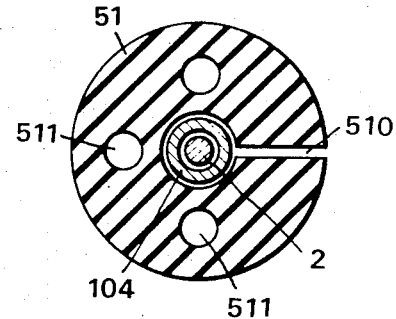

FLUID SHOCK ABSORBER

This invention relates to a damper device of the combined viscosity and friction damping type adapted to effectively absorb in a limited stroke range, the energy of impact of collision at the time of collision of vehicles, such for example as motor vehicles.

An object of this invention is to provide a damper device which is capable of absorbing a greater amount of energy of impact per unit area than conventional damper devices of the viscous damping type by virtue of the fact that frictional resistance damper means is utilized in combination with viscous resistance damper means which is controlled by viscous resistance in the compression stroke only.

Another object of the invention is to provide a damper device offering viscous resistance in addition to frictional resistance, so that the damper device is capable of offering a small amount of frictional resistance when the collision is of a minor accident and offering a great amount of frictional resistance when the collision is of a major accident.

Other and additional objects and features are those inherent in the invention shown, described and claimed herein which will become evident as the description proceeds.

In the drawings:

FIG. 2 is a sectional view taken along the line II—II of FIG. 1;

FIG. 3 is a sectional view of the first and second means for absorbing the energy of impact of the damper device according to this invention;

FIG. 4 is a sectional view taken along the line IV—IV of FIG. 3;

Figure 1:
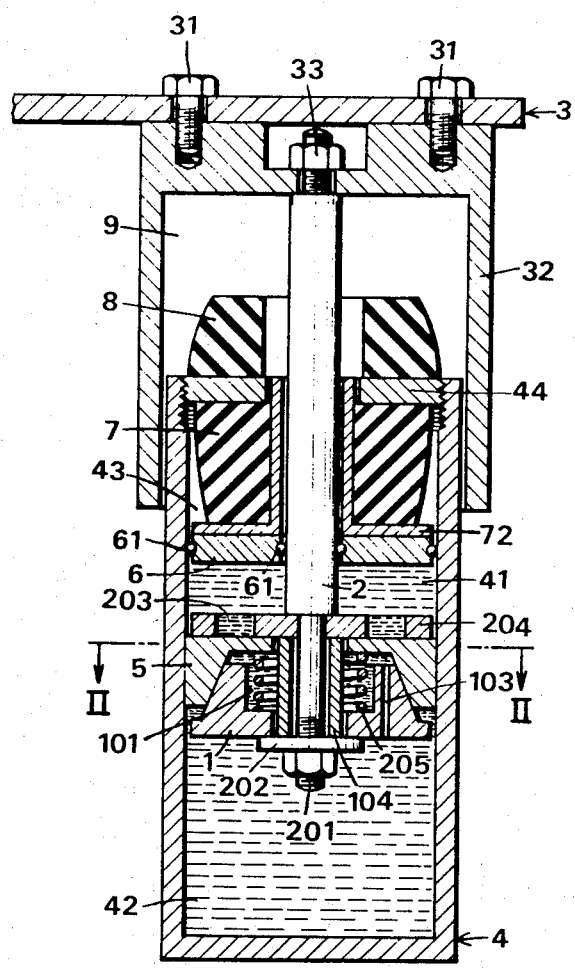
FIG. 1 is a sectional view of the damper device comprising one embodiment of this invention.

In FIG. 1 showing a first embodiment of this invention, a frustoconical piston 1 is secured by a nut 201 and a washer 202 to one end portion of a piston rod 2 which is secured at the other end portion by a nut 33 to a cylinder guide 32 which in turn is secured to a bumper 3 as by a bolt 31.

A cylinder 4 is secured to a body of a vehicle (not shown) by suitable means. A cup-shaped slider 5 formed in a plurality of pieces as shown in FIG. 2 and having a recess of inclined inner wall surface adapted to engage the conical surface of piston 1 is mounted for slight radial sliding movement between a retainer 204 formed with fluid orifices 203 and mounted on a reduced diameter portion of piston rod 2 on the one hand and one end of a spring 205 inserted in a recess 101 formed between piston 1 and a collar 104 mounted on the reduced diameter portion of piston rod 2 on the other.

41 and 42 are fluid chambers filled with a working fluid and maintained in communication with each other through an orifice 103 formed in piston 1.

A movable partition wall 6 mounted on piston rod 2 separates fluid chamber 41 from an air chamber 43, and seals are provided between an outer periphery of partition wall 6 and an inner wall of cylinder 4 and between an inner periphery of partition wall 6 and a surface of piston rod 2. Air chamber 43 is defined between movable partition wall 6 and a plug 44 for cylinder 4, and a compression rubber spring 7 which serves as a compressed member is mounted in air chamber 43 between movable partition wall 6 and plug 44. 72 is a retainer for compression rubber spring 7, and 8 is a stopper mounted on a suitable member in a space 9 defined between cylinder guide 32 and plug 44.

In FIG. 3, 51 is another form of slider made of a resilient material and formed with a cutout 510 and fluid orifices 511 as shown in FIG. 4.

Figure 5:
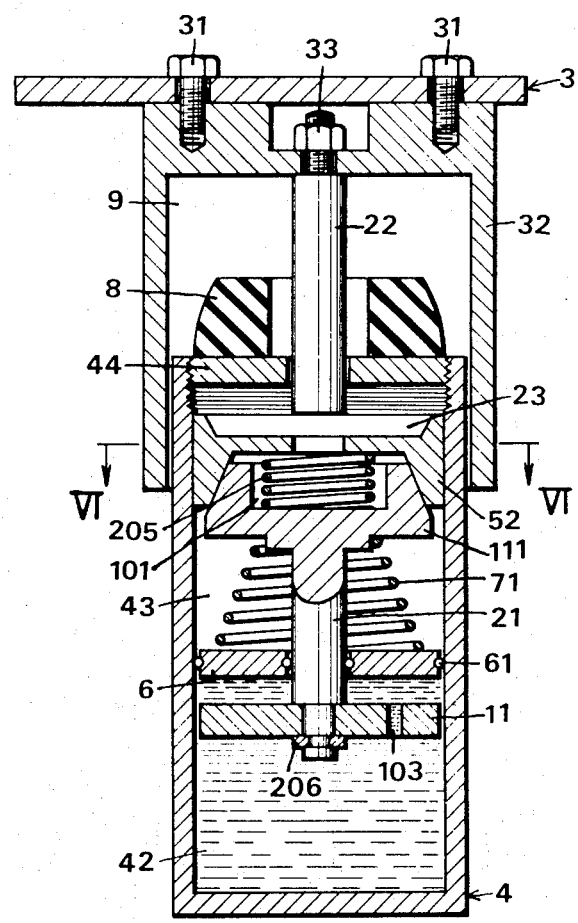
FIG. 5 is a sectional view of the damper device comprising another embodiment of this invention.

In FIG. 5 showing a second embodiment of this invention, a discal piston 11 is secured by a clip 206 to one end portion of a piston rod 21 which is formed at the other end portion with a frustoconical protrusion 111. Fluid chambers 41 and 42 filled with a working fluid are maintained in communication with each other through an orifice 103 formed in discal piston 11.

Figure 6:
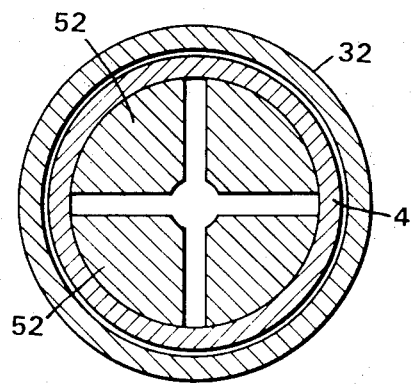
FIG. 6 is a sectional view taken along the line VI—VI of FIG. 5.

On the other hand, a push rod 22 secured at one end portion by nut 33 to cylinder guide 32 which is secured to the bumper 3 is formed at the other end portion with a protuberance 23 disposed in air chamber 43. A slider 52 formed in a plurality of pieces as shown in FIG. 6 and provided with an inner wall surface adapted to engage a conical surface of frustoconical protrusion 111 formed at the other end portion of piston rod 21 is disposed between protuberance 23 and frustoconical protrusion 111. Slider 52 is radially movable by the biasing force of a spring 205 mounted in a recess 101 formed in frustoconical protrusion 111.

Movable partition wall 6 provided with seals 61 for separating fluid chamber 41 from air chamber 43 is mounted on piston rod 21, and a compression spring 71 which serves as a compressed member is mounted between movable partition wall 6 and a back portion of frustoconical protrusion 111 formed at the other end portion of piston rod 21. A stopper 8 is of the same construction as a stopper 8 shown in FIG. 1.

Figure 7:
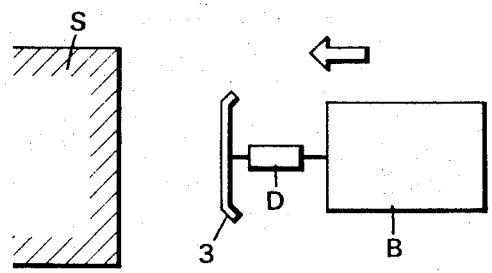
FIG. 7 is a schematic view showing the manner in which the damper device according to this invention is mounted on a vehicle.

In FIG. 7, S designates an obstacle, 3 a bumper, B a body of a vehicle and D a damper device.

Operation of the damper device according to this invention will be explained with reference to the embodiments shown in the drawings.

With reference to the embodiment shown in FIG. 1, if bumper 3 strikes against obstacle S, piston rod 2 will move downwardly in the figure and cause retainer 204 to move slider 5 downwardly in the figure, with the result that piston 1 also moves downwardly in the figure and the internal pressure of fluid chamber 42 is increased.

The working fluid in fluid chamber 42 will move into hydraulic chamber 41 through orifice 103 in piston 1 which is a first impact energy absorbing member so as to attenuate the initial forces of impact by its viscous resistance. However, when the rate at which piston 1 and retainer 204 move downwardly is high, the internal pressure of hydraulic chamber 42 rises to a higher level and presses slider 5 against piston 1.

Since piston 1 which is the first impact energy absorbing member and slider 5 are connected together in wedge shape, the force exerted by piston rod 2 axially thereof is converted into a radially directed force, so that slider 5 which is a second impact energy absorbing member is deformed and urged to move radially outwardly to press against an inner wall surface of cylinder 4. Thus, frictional resistance is produced between the outer periphery of slider 5 and the inner wall surface of cylinder 4 and the interfacial pressure between slider 5 and cylinder 4 is increased, so that a frictional force between slider 5 and the inner wall surface of cylinder 4 is increased.

On the other hand, movable partition wall 6 is moved upwardly in the figure by the quantity of fluid corresponding to the volume of the portion of piston rod 2 introduced into fluid chamber 42 and the back pressure of fluid produced by the first impact energy absorbing member in cylinder 4 so as to compress compression rubber spring 7 disposed in air chamber 43 which is a third impact energy absorbing member. Thus, the energy of impact is absorbed and attenuated.

The force of impact absorbed and attenuated by the first and third impact energy absorbing members is further absorbed and attenuated by stopper 8 which is a fourth impact energy absorbing member. The internal pressures of fluid chambers 41 and 42 are maintained at a higher level than atmospheric pressure during the time an external force is exerted on bumper 3, so that forces tending to move piston rod 2 upwardly in the figure to its original position is at work at all times.

Therefore, if the external force exerted on bumper 3 is removed, piston 1 will move upwardly in the figure to be restored to its original position in which it was disposed prior to the collision. Stated differently, if the load urging piston 1 and retainer 204 to move downwardly in the figure is removed upon releasing of bumper 3 from engagement with the obstacle S after the collision, the pressures in fluid chambers 41 and 42 will regain balance and piston 1 and slider 5 will be separated from each other by the biasing force of spring 205, so that slider 5 is restored to its original shape and return to its original position from its outwardly radially moved position. This removes the frictional force existing between the inner wall surface of cylinder 4 and slider 5.

The force which moves piston 1 upwardly is proportional to the rate of downward movement of piston 1. Since the rate of downward movement of piston 1 is maximized when bumper 3 first strikes against obstacle S, slider 5 is caused to press against piston 1 with a maximized force at the initial stages of collision.

The force perpendicularly exerted on the conical surface of piston 1 and the inclined inner wall surface of slider 5 is kept constant till relative slip is produced between piston 1 and slider 5. By setting the angle of the conical surface of piston 1 and the set load of spring 205 at levels such that relative slip is produced between piston 1 and slider 5 at the terminating stages of collision, it is possible to keep the frictional dragging of slider 5 on the inner wall surface of cylinder 4 substantially constant from the inital to the terminating stages of collision.

Since the frictional force produced between slider 5 and the inner wall surface of cylinder 4 at the initial stages of collision is substantially proportional to the rate of downward movement of piston 1 or the collision speed, the frictional force at the initial stages of collision may vary depending on the collision speed.

Figure 8A:
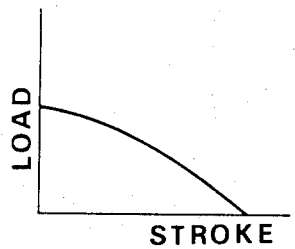
FIG. 8A to FIG. 8E are characteristic diagrams showing the relation between the load and the stroke of the impact energy absorbing members.
Figure 8B:
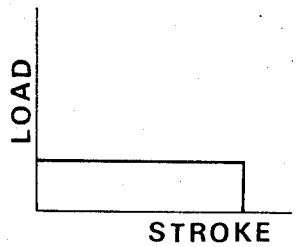
Figure 8C:
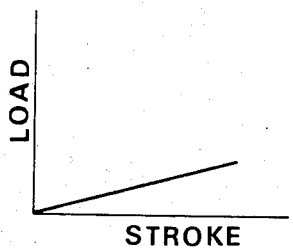
Figure 8D:
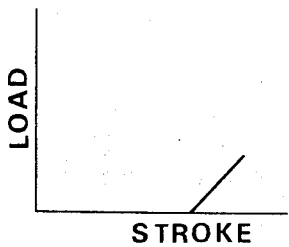
Figure 8E:
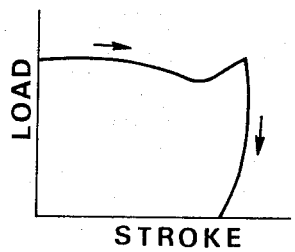

The relation between the load and the stroke of the first to fourth impact energy absorbing members described above is shown diagrammatically in FIG. 8A to FIG. 8E. FIG. 8A shows the characteristic of first impact energy absorbing member, FIG. 8B the characteristic of second impact energy absorbing member, FIG. 8C the characteristic of third impact energy absorbing member; and FIG. 8D the characteristic of fourth impact energy absorbing member. FIG. 8E shows the total of characteristics of first to fourth impact energy absorbing members. By combining the first to fourth impact energy absorbing members with one another as described herein, it is possible to provide a damper device which exhibits a substantially rectangular impact energy absorption characteristic which is most desirable for shock absorption.

Operation of the second embodiment will now be explained with reference to FIG. 5. In the first embodiment shown in FIG. 1 to FIG. 4, the first impact energy absorbing member and second impact energy absorbing member in the frictional resistance producing portion are connected together as a unit to function in fluid chamber 42. In the second embodiment, however, slider 52 which is the second impact energy absorbing member is made to function in air chamber 43, so that it is possible to provide for increased efficiency of frictional resistance and increased latitude of selection of materials.

More specifically, if the axially directed force is exerted on a portion between push rod 22 and piston rod 21, slider 52 will be urged by the conical protrusion 111 formed at the other end of piston rod 21 to move radially outwardly, so that a frictional force is produced between slider 52 and cylinder 4.

If bumper 3 is removed from engagement with obstacle S after collision, the resilient force of spring 205 will urge the conical protrusion 111 and slider 52 from engagement with each other, and the second impact energy absorbing member or slider 52 will be restored to its original position in which it was disposed before collision by the biasing force of compression spring 71 made of a compressible material which is the third impact energy absorbing member. In other respects, operation of the embodiment of FIG. 5 is similar to that of the embodiment of FIG. 1.

From the foregoing description, it will be appreciated that the damper device constructed and operating as aforementioned is capable of making the best use of its stroke to thereby achieve impact energy attenuating at high efficiency. That is, by utilizing frictional resistance in addition to viscous resistance offered by the working fluid, it is possible to increase the efficiency of impact energy absorption. Besides, the damper device is capable of acting as a soft damper when the collision involved is a minor accident because the speed of collision is low and acting as a hard damper when the collision involved is a major accident because the speed of collision is high. After the collision, the piston speed is reduced to zero, so that it is possible to restore the piston by the biasing force of a spring to its original position before the collision. The present invention makes it possible to vary the interfacial pressure of the friction surface irrespective of piston speed which has hitherto been impossible for conventional dampers.

What is claimed is:

1. A damper device comprising a cylinder guide having an open end with a piston rod extending therethrough and into a cylinder extending from within said cylinder guide, said device further comprising:

a. a first energy absorbing piston member connected to the piston rod within said cylinder and formed with an orifice for a fluid in said cylinder to pass therethrough when said fluid is compressed so as to attenuate an initial force of impact by the viscous resistance of the fluid passing through said orifice, b. a second impact energy absorbing sliding member disposed in the cylinder with its outer surface being maintained in contact with the contiguous cylinder wall and controlled by said first impact energy absorbing member to produce frictional resistance between an outer surface of said second impact energy absorbing member and an inner wall surface of the cylinder for further attenuating the force of impact, c. a third impact energy absorbing member made of a compressible material and disposed in the cylinder for continuously attenuating the force of impact by a back pressure of the fluid in the cylinder produced by said first impact energy absorbing member, and d. a fourth impact energy absorbing member made of a compressible material interposed between the outer end of the cylinder and the cylinder guide for further absorbing and attenuating the residual force of impact.

2. A damper device as claimed in claim 1 further comprising a spring interposed between said first impact energy absorbing member and said second impact energy absorbing member.

3. A damper device as claimed in claim 1, wherein said third impact energy absorbing member is a compression rubber spring and said fourth impact energy absorbing member is a stopper.

4. A damper device as claimed in claim 1, wherein said second sliding member is cup-shaped and has a recess in the inner wall adapted to engage the conical shaped first piston member and wherein said second sliding member is mounted for slight radial movement between a retaining member mounted on a reduced diameter portion of said piston rod and between a spring inserted in a recess formed between said piston and a collar mounted on the reduced diameter portion of said piston rod.

5. A damper device as claimed in claim 1, wherein the piston rod extending from the cylinder guide through the cylinder has a protruberance formed at the forward end in contact with one side of said second impact energy absorbing sliding member and wherein a second protrusion in contact with the other side of said sliding member is connected to said first energy absorbing piston member.

6. A damper device as claimed in claim 5 wherein the cylinder is divided into two fluid chambers by a movable partition wall, and the piston and the protrusion connected thereto are disposed in these two fluid chambers respectively.

* * * * *